United States Patent
Liu et al.

(10) Patent No.: US 12,202,227 B2
(45) Date of Patent: Jan. 21, 2025

(54) SEALABLE PEELABLE POLYESTER FILMS

(71) Applicant: Mylar Specialty Films U.S. Limited Partnership, Chester, VA (US)

(72) Inventors: Shengsheng Liu, Chester, VA (US); Nebojsa Pantelic, Chester, VA (US)

(73) Assignee: Mylar Specialty Films U.S. Limited Partnership, Chester, VA (US)

( * ) Notice: Subject to any disclaimer, the term of this patent is extended or adjusted under 35 U.S.C. 154(b) by 0 days.

(21) Appl. No.: 18/290,907

(22) PCT Filed: Sep. 9, 2022

(86) PCT No.: PCT/IB2022/058514
§ 371 (c)(1),
(2) Date: Jan. 22, 2024

(87) PCT Pub. No.: WO2023/037309
PCT Pub. Date: Mar. 16, 2023

(65) Prior Publication Data
US 2024/0269964 A1    Aug. 15, 2024

(30) Foreign Application Priority Data
Sep. 9, 2021 (GB) ..................... 2112836

(51) Int. Cl.
| | |
|---|---|
| B32B 15/04 | (2006.01) |
| B32B 5/18 | (2006.01) |
| B32B 15/09 | (2006.01) |
| B32B 15/12 | (2006.01) |
| B32B 15/20 | (2006.01) |
| B32B 27/36 | (2006.01) |
| B65D 53/04 | (2006.01) |
| B67B 3/00 | (2006.01) |
| B67B 3/20 | (2006.01) |

(52) U.S. Cl.
CPC ........... B32B 15/09 (2013.01); B32B 5/18 (2013.01); B32B 15/046 (2013.01); B32B 15/12 (2013.01); B32B 15/20 (2013.01); B32B 27/36 (2013.01); B65D 53/04 (2013.01); B67B 3/003 (2013.01); B67B 3/20 (2013.01); B32B 2255/10 (2013.01); B32B 2255/26 (2013.01); B32B 2307/30 (2013.01); B32B 2307/31 (2013.01); B32B 2307/518 (2013.01); B32B 2307/54 (2013.01); B32B 2307/7376 (2023.05); B32B 2307/746 (2013.01); B32B 2307/748 (2013.01); B32B 2435/02 (2013.01)

(58) Field of Classification Search
None
See application file for complete search history.

(56) References Cited

U.S. PATENT DOCUMENTS

| | | | | |
|---|---|---|---|---|
| 2004/0052993 | A1* | 3/2004 | Dawes | B32B 27/36 428/35.7 |
| 2005/0031814 | A1* | 2/2005 | Dawes | B32B 27/36 428/347 |
| 2009/0117362 | A1 | 5/2009 | Schosseler et al. | |
| 2010/0003377 | A1* | 1/2010 | Brennan et al. | B32B 27/36 426/106 |
| 2010/0068355 | A1* | 3/2010 | Berry et al. | B32B 27/36 426/396 |
| 2014/0065431 | A1* | 3/2014 | Sakellarides | B32B 27/36 428/480 |
| 2014/0127515 | A1* | 5/2014 | Sakellarides | B32B 27/36 428/413 |
| 2020/0198217 | A1 | 6/2020 | Liperoti et al. | |
| 2020/0331242 | A1* | 10/2020 | Toni et al. | B32B 27/36 |
| 2022/0403124 | A1* | 12/2022 | Shimizu et al. | B32B 27/36 |

FOREIGN PATENT DOCUMENTS

| | | | |
|---|---|---|---|
| EP | 1 370 608 A1 | 12/2003 | |
| EP | 2 108 673 A1 | 10/2009 | |
| WO | WO-2016083521 A1 * | 6/2016 | ............ C08J 7/0427 |
| WO | WO 2018/132442 A1 | 7/2018 | |
| WO | WO-2018153795 A1 * | 8/2018 | ............ B32B 27/08 |
| WO | WO-2021171190 A1 * | 9/2021 | ............ C08J 7/0427 |

OTHER PUBLICATIONS

International Search Report and Written Opinion for International Application No. PCT/IB2022/058514 dated Dec. 19, 2022.

* cited by examiner

*Primary Examiner* — Stephen F. Gerrity
(74) *Attorney, Agent, or Firm* — Wolf, Greenfield & Sacks, P.C.

(57) ABSTRACT

A polymeric film includes a polyester substrate layer and a heat-sealable polymeric layer disposed on one surface of the polyester substrate layer. In some cases, the heat-sealable polymeric layer includes a copolyester A having a glass transition temperature Tg(A) in an amount $W_A$ and a copolyester B having a glass transition temperature Tg(B) in an amount $W_B$. In certain cases, (i) $W_A > W_B$;
(ii) $W_A$ is at least 50 wt % by total weight of the heat-sealable polymeric layer;
(iii) $W_B$ is at least 10 wt % by total weight of the heat-sealable polymeric layer;
(iv) Tg(A)>Tg(B);
(v) Tg(B) is in the range of −35° C. to −10° C.; and
(vi) Tg(A) is in the range of −15° C. to 5° C.

35 Claims, No Drawings

SEALABLE PEELABLE POLYESTER FILMS

CROSS-REFERENCE TO RELATED APPLICATIONS

This application is a national stage filing under 35 U.S.C. § 371 of International Application No. PCT/IB2022/058514, filed Sep. 9, 2022, which claims the benefit of United Kingdom Application No. 2112836.8, filed Sep. 9, 2021, each of which is hereby incorporated herein by reference in its entirety.

The present invention relates to sealable peelable films comprising a polyester substrate coated with a copolyester composition, and the use of such films in packaging, and particularly as a cap-liner film. The films of the present invention exhibit improved seal and peel characteristics.

Heat-sealable, peelable films have long been used in the packaging of foodstuffs and beverages in order to keep goods sealed and fresh in a container prior to the end-use by the consumer. Typically, heat-sealable peelable films are multi-layer films, in which a substrate layer provides the requisite strength, and one or more additional layer(s) provide the heat-sealable functionality. Examples of such sealant composite films include those comprising a substrate layer of polyester (typically polyethylene terephthalate (PET)) onto which is extrusion-coated a heat-sealable layer. Such sealant films should form a strong heat-seal bond to the container in order to avoid leakage of the contents of the packaging and retain their freshness, but not so strong that the film fractures during peeling. An advantageous characteristic of sealant films is that they should exhibit a "clean peel", i.e. no residue of the heat-seal layer or cap-liner should remain on the container after peeling.

One such packaging application for sealant films is cap-liners. A cap-liner is a device sealed on the top of a container such as a bottle in order to preserve, and provide security to, the contents of the container and to avoid leaking. Cap-liners provide tamper-evident hermetic seals suitable for use with foods, drugs, beverages, alkalis, acids, oils, organic solvents, flammable materials, powders, pellets and many other products. They are particularly effective for products that must be kept free from contamination, oxidation and moisture. Prior to sealing a container, the cap-liner is usually inserted into a suitable cap or closure device, typically by the cap manufacturer.

Cap-liners can be one-piece or two-piece, depending on the identity and intended use of the product. A one-piece liner is typically a foam-backed or paper-backed laminate consisting essentially of a paper or foam layer, an adhesive layer, a metallic foil layer and a heat-sealable film, in that sequence. A two-piece liner is typically a multilayer laminate containing a pulpboard layer, wax layer, a metallic foil layer and a heat-sealable film, in that sequence. The heat-sealable film in such cap-liners typically consists of a polymeric substrate layer and a polymeric heat-sealable layer, wherein such a multilayer film is disposed in the cap-liner such that the polymeric substrate layer is adjacent the metallic foil layer. Such cap-liners are typically made by first manufacturing a multilayer film comprising the polymeric substrate layer and polymeric heat-sealable layer, typically by coextrusion of the two layers or by coating the heat-sealable polymer onto a pre-formed polymeric substrate. That multilayer film is then laminated with the metallic foil and other layers to provide the cap-liner.

When sealing a container with a cap containing a cap-liner, the product is filled into the container, the cap is put into place, and the cap of the filled container is then exposed to heat, causing the polymeric heat-sealable layer of the cap-liner inside the cap to adhere to the rim of the container. With a one-piece cap-liner, the entire liner is released from the cap after the heat-sealing process. With a two-piece cap-liner, the heating process melts the wax, which is then absorbed into the pulpboard, releasing it from the foil layer and such that the pulpboard layer remains inside the cap for improved resealing after the foil liner has been removed. Thus, in use, the cap-liner (or, in the case of a two-piece liner, the multilayer part thereof which remains sealed to the container) is peeled off the container in order to access the contents stored inside the container. A one-piece cap-liner is typically used for a single-use product or dry product, while a two-piece cap-liner is typically used if there is liquid inside the container or if the container will be resealed. The two-piece liner allows a package to function as a resealable, multi-serving container. Optionally, the upper surface of the cap-liner which is sealed to the container and which is visible after removal of the cap may carry printed information for the consumer.

The heating step which is used in the sealing of the cap-liner to a container is typically effected by induction heating. An induction coil in the sealing head generates a magnetic field, which generates heat in the metallic foil layer which is transferred to the polymeric heat-sealable layer, thereby effecting a heat-seal bond between the polymeric heat-sealable layer and the container. The induction heating step typically generates sealing temperatures in the range of about 120 to about 205° C.

One problem with conventional cap-liners which are currently commercially available is that the strength of the heat-seal bond can vary significantly with the sealing temperature. In particular, the bond strength increases with an increase in the sealing temperature. This is a problem because the magnetic field in conventional induction heating systems generates a non-uniform temperature profile across the cap-liner, thereby creating a heat-seal bond which has different bond strengths at different regions around the rim of the container, i.e. an inconsistent heat-seal bond within a single cap-liner. These defects in the cap-liner heat-seal bond are referred to as a "partial seal" or "overheated seal", and can result in one or more of the following disadvantages: (i) leakage of liquid content; (ii) reduced shelf life of the content; (iii) residue left on the container rim after peeling (i.e. not a clean peel); and (iv) burning/browning of the container or foil.

A further problem with conventional cap-liners is that the strength of the heat-seal bond can significantly increase over time, referred to as "sealed sample ageing". This complicates the process for optimization of the sealing conditions of the induction heating system, and creates downstream difficulties for quality control of the product.

It is an object of this invention to address one or more of the afore-mentioned problems. In particular it is an object of the invention to provide a cap-liner in which variation of heat-seal bond strength with variation in sealing temperature is minimised and/or in which increases in heat-seal bond strength over time are minimised.

According to a first aspect of the present invention, there is provided a polymeric film comprising a polyester substrate layer and a heat-sealable polymeric layer disposed on one surface of said polyester substrate layer, wherein the heat-sealable polymeric layer comprises copolyester A having a glass transition temperature $Tg(A)$ in an amount $W_A$ and copolyester B having a glass transition temperature $Tg(B)$ in an amount $W_B$, wherein:

(i) $W_A > W_B$;

(ii) $W_A$ is at least 50 wt % by total weight of the heat-sealable polymeric layer;

(iii) $W_B$ is at least 10 wt % by total weight of the heat-sealable polymeric layer;

(iv) $Tg(A) > Tg(B)$;

(v) $Tg(B)$ is in the range of −35° C. to −10° C.; and (vi) $Tg(A)$ is preferably in the range of −15° C. to 5° C.

The polyester substrate layer is a self-supporting film or sheet, by which is meant a film or sheet capable of independent existence in the absence of a supporting substrate.

The polyester substrate layer is preferably an oriented film, preferably uniaxially or biaxially oriented, preferably biaxially oriented.

The substrate layer may be described as semi-crystalline. As used herein, the term "semi-crystalline" refers to a film which exhibits a crystallinity of at least 5%, preferably at least 10%, preferably at least 15%, preferably at least 20%, preferably at least 25%, and typically no higher than 50% or 45% or 40%.

The polyester of the substrate layer is suitably a crystallisable thermoplastic polyester. Synthetic linear polyesters are preferred. Suitable polyesters include those derived from one or more dicarboxylic acids, such as terephthalic acid, isophthalic acid, phthalic acid, 2,5-, 2,6- or 2,7-naphthalenedicarboxylic acid, 4,4'-diphenyldicarboxylic acid, hexahydro-terephthalic acid, 1,10-decanedicarboxylic acid, and aliphatic dicarboxylic acids including those of the general formula $C_nH_{2n}(COOH)_2$ wherein n is 2 to 8 (such as succinic acid, glutaric acid sebacic acid, adipic acid, azelaic acid, suberic acid or pimelic acid); and from one or more glycols, particularly an aliphatic or cycloaliphatic glycol, such as ethylene glycol, 1,3-propanediol, 1,4-butanediol, neopentyl glycol and 1,4-cyclohexanedimethanol (CHDM).

The dicarboxylic acid component of the substrate layer polyester preferably comprises at least one aromatic dicarboxylic acid (which is preferably selected from terephthalic acid and 2,6-naphthalenedicarboxylic acid, and is preferably terephthalic acid), and optionally further comprises a second, different dicarboxylic acid preferably selected from the dicarboxylic acids noted above, and preferably from an aromatic dicarboxylic acid (particularly isophthalic acid) and the aliphatic dicarboxylic acids noted above. Thus, the polyester is preferably derived from an aromatic dicarboxylic acid, preferably terephthalic acid or 2,6-naphthalenedicarboxylic acid, preferably terephthalic acid. Preferably, the dicarboxylic acid component of the substrate layer polyester contains only one aromatic dicarboxylic acid, which is preferably terephthalic acid or 2,6-naphthalenedicarboxylic acid, and is preferably terephthalic acid.

The glycol component of the substrate layer polyester preferably comprises at least one aliphatic diol, at least one of which is ethylene glycol. Preferably, the glycol component of the base layer polyester is an aliphatic diol, preferably ethylene glycol.

A preferred substrate layer polyester is selected from polyethylene terephthalate (PET) and polyethylene naphthalate (PEN), or a PET-based or PEN-based copolyester. Polyethylene terephthalate (PET) or a copolyester thereof is particularly preferred. Preferably the substrate layer polyester is PET.

The film-forming polymeric resin is the major component of the substrate layer, and makes up at least 70% by weight of the total weight of the substrate layer, preferably at least 80%, preferably at least 85%, preferably at least 90%, preferably at least 95%, more typically at least 98%, more typically at least 99% by weight of the total weight of the substrate layer.

The intrinsic viscosity of the polyester from which the substrate layer is manufactured is preferably at least about 0.60, preferably at least about 0.61, preferably at least 0.62, preferably at least 0.63, preferably at least 0.64, preferably at least 0.65, preferably at least about 0.70, preferably at least about 0.75. Preferably, the intrinsic viscosity of the substrate layer polyester is not more than 0.85, preferably not more than 0.83.

Formation of the polyesters is conveniently effected in a known manner by condensation or ester interchange, generally at temperatures up to about 295° C. In a preferred embodiment, solid state polymerisation may be used to increase the intrinsic viscosity of the polyesters to the desired value, using conventional techniques well-known in the art, for instance using a fluidised bed such as a nitrogen fluidised bed or a vacuum fluidised bed using a rotary vacuum drier.

The substrate layer may further comprise an additive conventionally employed in the manufacture of polyester films. Thus, agents such as particulate fillers, anti-blocking agents (or slip additives), anti-fog agents, hydrolysis stabilisers, anti-oxidants, UV-stabilisers, cross-linking agents, dyes, lubricants, radical scavengers, thermal stabilisers, surface active agents, gloss improvers, prodegradents, viscosity modifiers and dispersion stabilisers may be incorporated as appropriate.

Of particular utility are particulate fillers. Particulate fillers can improve handling and windability during manufacture (i.e. they function as anti-blocking agents) and/or modulate optical properties, as is well known in the art. The particulate filler is typically a particulate inorganic filler (e.g. metal or metalloid oxides, such as alumina, titania, talc and silica (especially precipitated or diatomaceous silica and silica gels), calcined china clay and alkaline metal salts, such as the carbonates and sulphates of calcium and barium). A particulate inorganic filler is preferably finely-divided, and the volume distributed median particle diameter (equivalent spherical diameter corresponding to 50% of the volume of all the particles, read on the cumulative distribution curve relating volume % to the diameter of the particles—often referred to as the "D(v,0.5)" value) thereof is preferably in the range from 0.01 to 5 µm, more preferably 0.05 to 1.5 µm, and particularly 0.15 to 1.2 µm. Preferably at least 90%, more preferably at least 95% by volume of the inorganic filler particles are within the range of the volume distributed median particle diameter±0.8 µm, and particularly ±0.5 µm. Particle size of the filler particles are suitably measured by laser light diffraction.

Further classes of anti-blocking agents are fatty amides (such as erucamide, stearyl erucamide or benehamide) and waxes (for instance polyolefin waxes, ester waxes or carnauba wax), as is conventional in the art.

The aforementioned conventionally employed additives may be introduced into the polymer in a conventional manner. For example, by mixing with the monomeric reactants from which the film-forming polymer is derived, or the components may be mixed with the polymer by tumble or dry blending or by compounding in an extruder, followed by cooling and, usually, comminution into granules or chips. Masterbatching technology may also be employed.

The polymeric material of the heat-sealable layer is capable of softening to a sufficient extent on heating that its viscosity becomes low enough to allow adequate wetting for it to adhere to the surface to which it is being bonded. The heat-sealable layer is formed from a copolyester blend comprising at least two (preferably only two) copolyesters, referred to herein as copolyester A and copolyester B. It will be appreciated that each copolyester in the copolyester blend is different from the other copolyester(s) in the copolyester blend, i.e. copolyester A is different from copolyester B.

The copolyesters of the heat-sealable layer may be amorphous or semi-crystalline.

The glass transition temperature Tg(A) of copolyester A is greater than the glass transition temperature Tg(B) of copolyester B. Preferably Tg(B) is at least 5° C., preferably from 10 to 15° C., lower than Tg(A).

Preferably, Tg(A) is in the range of −15° C. to 5° C., preferably at least −10° C., preferably no more than 0° C., and preferably in the range of −10° C. to 0° C.

Preferably, Tg(B) is in the range of −35° C. to −10° C., preferably at least −30° C., preferably no more than −15° C., and preferably in the range of −30° C. to −15° C.

Each of said copolyesters of the heat-sealable layer is derived from at least 3 different monomeric repeating units, and preferably derived from only 3 different monomeric repeating units, wherein the monomeric repeating units are selected from the dicarboxylic acid(s) and the glycol(s) referred to hereinabove. Preferred copolyesters are derived from an aromatic dicarboxylic acid, an aliphatic dicarboxylic acid and a glycol. The aromatic dicarboxylic acid is preferably terephthalic acid, the aliphatic dicarboxylic acid preferably has the general formula $C_nH_{2n}(COOH)_2$ wherein n is 2 to 8 (such as succinic acid, glutaric acid sebacic acid, adipic acid, azelaic acid, suberic acid or pimelic acid), and the glycol is preferably an aliphatic diol, preferably ethylene glycol.

The aromatic dicarboxylic acid in each of said copolyesters is preferably the same, i.e. the aromatic dicarboxylic acid in copolyester A is the same as the aromatic dicarboxylic acid in copolyester B. Similarly, the glycol in each of said copolyesters is preferably the same, i.e. the glycol in copolyester A is the same as the glycol in copolyester B. In a preferred embodiment, said copolyesters differ in respect of the identity of the aliphatic dicarboxylic acid, i.e. the aliphatic dicarboxylic acid in copolyester A is the different from the aliphatic dicarboxylic acid in copolyester B.

The molar ratio of aromatic dicarboxylic acid (Ar-diacid) to aliphatic dicarboxylic acid (Al-diacid) in said copolyesters is preferably in the range of from 90:10 to 10:90, preferably from 80:20 to 20:80, preferably from 70:30 to 30:70, preferably from 60:40 to 30:70, and preferably from 60:40 to 40:60 (Ar-diacid:Al-acid). Thus, the aliphatic dicarboxylic acid preferably makes up from 10 to 90 mol %, preferably from 20 to 80 mol %, preferably from 30 to 70 mol %, preferably from 40 to 60 mol % of the total acid fraction of the copolyester, with the balance being made up of the aromatic dicarboxylic acid.

Preferably, the aliphatic dicarboxylic acid content of copolyester A is lower than the aliphatic dicarboxylic acid content of copolyester B.

Thus, preferably the aliphatic dicarboxylic acid content of copolyester A is no more than 50 mol %, preferably from 10 to 50 mol %, preferably from 20 to 50 mol %, preferably from 30 to 50 mol %, for instance from 40 to 50 mol % of the total acid fraction of the copolyester.

Preferably the aliphatic dicarboxylic acid content of copolyester B is greater than 40 mol %, preferably greater than 45 mol %, preferably greater than 50 mol %, preferably greater than 55 mol %, preferably from 50 to 90 mol %, preferably from 50 to 80 mol %, preferably from 50 to 70 mol %, for instance from 50 to 60 mol % of the total acid fraction of the copolyester.

Said copolyesters may be amorphous or semi-crystalline.

Copolyester A is the major copolyester in the heat-sealable layer and is preferably present in an amount $W_A$ which is at least 50 wt %, preferably from 50 to 90 wt %, preferably from 50 to 89 wt %, by total weight of the heat-sealable polymeric layer.

Copolyester B is the minor copolyester in the heat-sealable layer and is preferably present in an amount $W_B$ which is at least 10 wt %, preferably from 10 to 50 wt %, preferably from 10 to 45 wt %, by total weight of the heat-sealable polymeric layer.

Without intending to be bound by theory, the inventors consider that the primary function of copolyester A is to control the seal strength of the film to the container to be sealed, while the primary function of copolyester B is to control or balance the peel performance of the film from the container.

Preferably, the heat-sealable layer further comprises one or more anti-blocking agent(s) to improve the handling properties of the film. Preferably the total amount of anti-blocking agents is no more than about 5 wt %, and preferably from about 1 to about 5 wt %, by total weight of the heat-sealable polymeric layer. Preferably, the heat-sealable layer comprises a plurality of anti-blocking agents for instance, a silica anti-blocking agent and an organic anti-blocking agent, as described hereinabove.

Preferably the heat-sealable polymeric layer comprises from 50 to 89 wt % of copolyester A, from 10 to 45 wt % of copolyester B, and from 1 to 5 wt % of anti-blocking agent(s), by total weight of the heat-sealable polymeric layer.

Optionally, the heat-sealable layer further comprises one or more other additive(s) conventional in polyester films, as described above, and particularly said layer further comprises one or more tackifier(s) and/or one or more anti-fog agent(s). The total amount of any tackifier(s) present in the heat-sealable layer should be no more than about 30 wt %, by total weight of the heat-sealable polymeric layer. The total amount of any anti-fogging agent(s) present in the heat-sealable layer should be no more than about 10 wt %, by total weight of the heat-sealable polymeric layer. A tackifier provides increased tackiness to the heat-sealable layer composition. Suitable tackifiers are well-known in the art and include a variety of natural and synthetic resins, and typically fall into three categories, namely: hydrocarbon resins (including $C_5$ aliphatic resins, $C_9$ aromatic resins and DCPD cyclo-aliphatic resins); rosin esters; and terpene resins (particularly polyterpenes based on pinene, and phenol and styrene modified pinene-based terpenes). Tackifier resins can be liquid, semi-solid to solid, or solid, including complex amorphous materials generally in the form of mixtures of organic compounds having no definite melting point and no tendency to crystallize. Such tackifier resins may be insoluble in water and can be of vegetable or animal origin, or can be synthetic resins. Thus, suitable tackifiers include, but are not limited to, para-coumarone-indene resins, terpenes (including styrenated terpenes), aromatic hydrocarbon resins, aromatic/aliphatic hydrocarbon resins and their partially or fully hydrogenated derivatives, rosins and rosin esters. Butadiene-styrene resins or polybutadiene resins may also be used as tackifiers. An "anti-fogging agent" prevents or retards the formation of water droplets on a surface of a film. Suitable anti-fogging agents are well-known in the art and may be selected from, for instance, surfactants which are designed to reduce surface tension of water, such as sorbitan, fatty esters, glycerol monostearate, glycerol monooleate and fatty alcohols.

It will be appreciated that the amounts (wt %) of copolyester A, copolyester B, said preferred anti-blocking agent(s), and said optional conventional additive(s) such as tackifier(s) and anti-fogging agent(s) should total 100%.

The softening point of copolyester A is preferably from 120 to 160° C., preferably from 130 to 150° C., determined according ASTM E28-18.

The softening point of copolyester B is preferably from 60 to 120° C., preferably from 80 to 110° C., determined according ASTM E28-18.

The tensile strength at break of copolyester A is preferably at least 1000 psi, preferably from 1500 to 5000 psi, determined according ASTM D638-14.

The tensile strength at break of copolyester B is preferably at least 200 psi, preferably from 250 to 1500 psi, preferably less than 1500, determined according ASTM D638-14.

The elongation at break of copolyester A is preferably at least 250%, preferably from 500 to 2000%, determined according ASTM D638-14.

The elongation at break of copolyester B is preferably at least 500%, preferably from 1000 to 2500%, determined according ASTM D638-14.

Formation of the composite film may be effected by conventional techniques well-known in the art. Conveniently, formation of the substrate is effected by extrusion, in accordance with the procedure described below.

In general terms the process comprises the steps of extruding a layer of molten polyester at a temperature within the range of from about 275 to about 300° C., preferably from about 290 to 295° C., quenching the extrudate and preferably orienting the quenched extrudate in at least one direction. The film may be uniaxially oriented, but is preferably biaxially oriented by drawing in two mutually perpendicular directions in the plane of the film to achieve a satisfactory combination of mechanical and physical properties. Orientation may be effected by any process known in the art for producing an oriented film, for example a tubular or flat film process. Biaxial orientation is effected by drawing in two mutually perpendicular directions in the plane of the film to achieve a satisfactory combination of mechanical and physical properties. In a tubular process, simultaneous biaxial orientation may be effected by extruding a thermoplastic polyester tube which is subsequently quenched, reheated and then expanded by internal gas pressure to induce transverse orientation, and withdrawn at a rate which will induce longitudinal orientation. Suitable simultaneous biaxial orientation processes are disclosed in EP-2108673-A and US-2009/0117362-A1, the disclosure of which processes is incorporated herein by reference.

In the preferred flat film process, the film-forming polyester is extruded through a slot die and rapidly quenched upon a chilled casting drum to ensure that the polyester is quenched to the amorphous state. Orientation is then effected by stretching the quenched extrudate in at least one direction at a temperature above the glass transition temperature of the polyester. Sequential orientation may be effected by stretching a flat, quenched extrudate firstly in one direction, usually the longitudinal direction, i.e. the forward direction through the film stretching machine, and then in the transverse direction. Forward stretching of the extrudate is conveniently effected over a set of rotating rolls or between two pairs of nip rolls, transverse stretching then being effected in a stenter apparatus.

Stretching is generally effected so that the dimension of the oriented film is from 2 to 5, more preferably 2.5 to 4.5 times its original dimension in the or each direction of stretching. More preferably, stretching is effect so that the dimension of the oriented film is from 3.0 to 3.3 times its original dimension in the forward draw, and from 3.3 to 3.9 times its original dimension in the sideways draw. Greater draw ratios (for example, up to about 8 times) may be used if orientation in only one direction is required. Stretching is conventionally effected at temperatures higher than the Tg of the substrate layer polyester, preferably at least about 5° C. higher, preferably at least about 15° C. higher than the Tg, and preferably in the range of from about Tg+5° C. to about Tg+75° C., preferably from about Tg+5° C. to about Tg+30° C. Thus, typically stretching is effected at temperatures in the range of about 5 to about 155° C., preferably about 5 to about 110° C. It is not necessary to stretch equally in the machine and transverse directions although this is preferred if balanced properties are desired.

A stretched film may be, and preferably is, dimensionally stabilised by heat-setting under dimensional support at a temperature above the glass transition temperature of the substrate layer polyester but below the melting temperature thereof, to induce the desired crystallisation of the polymer. During the heat-setting, a small amount of dimensional relaxation may be performed in the transverse direction (TD) by a procedure known as "toe-in". Toe-in can involve dimensional relaxation of the order 2 to 4%. While dimensional relaxation in the process or machine direction (MD) is also possible, as is known in the art. The actual heat-set temperature and time will vary depending on the composition of the film and its desired final thermal shrinkage but should not be selected so as to substantially degrade the toughness properties of the film such as tear resistance. Within these constraints, preferred films are heat-set at a temperature from about 80° C. less than the melting temperature of the substrate layer polyester (i.e. $T_M$–80° C.) to about 10° C. less than $T_M$ (i.e. $T_M$–10° C.), preferably from about $T_M$–70° C. to about $T_M$–20° C. Thus, the heat-set temperature is suitably in the range of from about 130 to about 245° C., preferably from about 150 to about 245° C., and preferably at least 180° C., preferably in the range of 190 to 230° C. After heat-setting the film is typically quenched rapidly in order induce the desired crystallinity of the polymer.

The film may be further stabilized through use of an in-line relaxation stage. Alternatively the relaxation treatment can be performed off-line. In this additional step, the film is heated at a temperature lower than that of the heat-setting stage, and with a much reduced MD and TD tension. The tension experienced by the film is a low tension and typically less than 5 kg/m, preferably less than 3.5 kg/m, preferably less than 2.5 kg/m, and typically in the range of 1.0 to 2.0 kg/m of film width. For a relaxation process which controls the film speed, the reduction in film speed (and therefore the strain relaxation) is typically in the range 0 to 2.5%, preferably 0.5 to 2.0%. There is no increase in the transverse dimension of the film during the heat-stabilisation step. The temperature to be used for the heat stabilisation step can vary depending on the desired combination of properties from the final film, with a higher temperature giving better, i.e. lower, residual shrinkage properties. A temperature of 135 to 250° C. is generally desirable, preferably 150 to 230° C., more preferably 170 to 200° C. The duration of heating will depend on the temperature used but is typically in the range of 10 to 40 seconds, with a duration of 20 to 30 seconds being preferred. This heat stabilisation process can be carried out by a variety of methods, including flat and vertical configurations and either "off-line" as a separate process step or "in-line" as a continuation of the film manufacturing process. Film thus processed will exhibit a smaller thermal shrinkage than that produced in the absence of such post heat-setting relaxation.

Formation of the film comprising the polyester substrate layer and heat-sealable layer is preferably effected by coating the heat-sealable layer composition onto the substrate layer. Coating may be effected using any suitable coating technique, including spray coating, roll coating, slot coating, meniscus coating, immersion coating, wire-bar coating, air-knife coating, curtain coating, doctor knife coating, direct or reverse gravure coating and the like. Coating may be conducted "off-line", i.e. after any stretching and subsequent heat-setting employed during manufacture of the substrate layer, or "in-line", i.e. wherein the coating step is performed before, during or between any stretching operation(s) employed. An in-line coating operation for a biaxially stretched film is typically performed between the forward and sideways stretches of biaxial stretching ("inter-draw" coating). In the present invention, the coating is preferably conducted off-line, i.e. after manufacture of the substrate layer.

Preferably, the heat-sealable polymeric layer is applied to the substrate by coating a coating composition comprising the components of the heat-sealable layer in a coating vehicle, typically an organic solvent or mixture thereof, which is conventional in the art and referred to generally as solution coating. Any suitable coating vehicle or solvent conventional in the art may be used, for instance THF, ethyl acetate, methyl ethyl ketone, acetone, toluene, dioxolane, cyclohexanone, xylene, butyl acetate, methyl isobutyl ketone or chlorinated solvents, and typically THF or toluene. The amount of coating vehicle present in the coating composition is typically in the range of from 40 to 80 wt % of the coating composition, with the remainder of the coating composition being made up of said copolyesters, said preferred anti-blocking agents, and optionally said tackifiers, anti-fogging agents and other conventional additive(s) as described hereinabove. After coating, the coated substrate is dried to remove the coating vehicle and to provide a film of a heat-sealable polymeric layer on a polyester substrate layer.

The total thickness of the film is preferably from about 5 to about 250 µm, preferably from about 8 to about 125 µm, preferably from about 8 to about 50 µm, and preferably from about 12 to about 26 µm.

The thickness of the heat-sealable layer is preferably no more than 30%, more preferably no more than 25% and more preferably no more than 20%, and preferably at least 2.5% more preferably at least 5%, and preferably from about 10% to about 20%, of the total thickness of the polymeric film. Typically, a heat-sealable layer has a thickness of no more than about 25 µm, preferably no more than about 10 µm, more preferably no more than about 5 µm, preferably no more than about 2 µm, preferably at least 0.5 µm, and preferably in a range of from about 0.5 to about 5 µm. Preferably the coat-weight of the heat-seal polymeric layer is from about 1 to about 5 g/m².

The heat-seal peel strength of the film is preferably in the range of 500 to 1400 g/inch, preferably 500 to 1200 g/inch, measured as defined herein, i.e. when heat-sealed at a temperature in the range of from 121 to 204° C. with a dwell time of 1 second and a pressure of 40 psi (275.79 kPa). Preferably, the heat-seal peel strength of the film is in the range of 500 to 1400 g/inch, preferably 500 to 1200 g/inch, when heat-sealed at any temperature in the range of from 121 to 204° C. with a dwell time of 1 second and a pressure of 40 psi (275.79 kPa), as described herein. Such heat-seal peel strengths provide an adequately strong seal without risk of leakage and a lower risk of the cap-liner shredding during peeling.

The films of the first aspect of the invention are of particular use as sealant films, and find utility for sealing containers in a number of applications, including as lidding films and cap-liner films. The container serves as a receptacle for a product, for instance foods, drugs, beverages, chemicals such as alkalis, acids, oils, organic solvents, flammable materials, powders, pellets, and the like.

The films, lidding films and cap-liners of the invention are of particular utility in generating a hermetic seal.

The container may be made from a variety of materials, particularly plastic (particularly polyester) or glass. The container may be made from a polyester material, and of particular utility are APET/CPET trays (wherein APET refers to amorphous PET and CPET refers to crystalline (or semi-crystalline) PET).

The lidding film may optionally comprise a metallic foil layer disposed on the film of the first aspect, such that the layer sequence is metallic foil layer/polyester substrate layer/polymeric heat-sealable layer.

A film of the first aspect of the invention may also function as a lidding film without a metallic foil layer, and such lidding films find particular utility as sealant films for APET/CPET trays.

According to a second aspect of the invention there is provided a lidding film comprising the film of the first aspect of the invention and further comprising a metallic foil layer such that the layer sequence is: metallic foil layer/polyester substrate layer/polymeric heat-sealable layer.

The metallic foil layer may be any suitable metallic foil layer used in the art, and is preferably an aluminium foil layer. The metallic foil layer may of any suitable thickness conventional in the art, and is preferably in the range of about 25 to about 50 µm.

Preferably said lidding film is a cap-liner.

Said cap-liner may be a one-piece cap liner further comprising a paper or foam layer disposed on the side of the metallic foil layer which is remote from the polymeric substrate layer, such that the layer sequence is: paper or foam layer/metallic foil layer/polyester substrate layer/heat-sealable layer. An adhesive layer is preferably disposed between the metallic foil layer and the paper or foam layer, as is conventional in the art of cap-liners, and any suitable adhesive may be used.

Said cap-liner may be a two-piece cap-liner comprising a pulpboard layer, a wax layer, a metallic foil layer, a polymeric substrate layer and a polymeric heat-sealable layer, in that sequence.

The paper, foam, pulpboard and wax layers may be any conventional paper, foam, pulpboard and wax layers known and used in the art of cap-liners. The paper, foam or pulpboard layer is typically 50-1000 µm in thickness.

The cap-liners of the second aspect of the invention are preferably made by first manufacturing a film comprising the polymeric substrate layer and polymeric heat-sealable layer, as described hereinabove in the first aspect, and then laminating said film with the metallic foil layer and said other layers to provide the cap-liner.

The longest dimension of the cap-liner is preferably no more than 70 mm, preferably no more than about 65 mm.

Preferably, the cap-liner is circular, and preferably has a diameter of no more than 70 mm, typically no more than about 65 mm.

The preferences and disclosure of the first aspect are equally applicable to the second aspect.

According to a third aspect of the present invention, there is provided a method of sealing a container comprising an opening, wherein said method comprises the steps of:
 (i) providing or preparing a film according to the first aspect of the invention;
 (ii) laminating a film from step (i) with a metallic foil, and either a paper or foam layer or pulpboard and wax layers, to form a cap-liner according to the second aspect of the invention;
 (iii) providing a container;
 (iv) providing a cap for the container;
 (v) inserting the cap-liner from step (ii) inside the cap;
 (vi) disposing the cap over the opening of the container such that the heat-sealable layer of the cap-liner contacts the container; and
 (vii) subjecting the cap to electromagnetic induction heating, typically by passing the assembly of cap and container under an induction coil, thereby sealing the cap-liner to the container.

Said cap may be any cap or other closure device, for instance as known and used in the art. Said cap is typically made from a polymeric material, for instance polypropylene or polyethylene. It will be appreciated that suitable caps have a planar top portion and a side-wall portion which extends substantially perpendicularly from the planar top portion. The interior surface of the side-wall portion may exhibit a screw-thread disposed therein. The cap is preferably substantially cylindrical and closed at one end by said planar top portion.

Said container may be any conventional container, for instance as known and used in the art, and such containers are typically plastic (particularly polyester) or glass containers. The opening of said container typically exhibits a circular cross-section. Said container preferably comprises a body portion and a cylindrical neck portion, preferably wherein the neck portion exhibits a screw-thread.

Said cap-liner is inserted into the cap such that the paper or foam or pulpboard layer contacts the interior surface of the planar top portion of the cap, and such that the heat-sealable layer is exposed and available for contacting the container to be sealed.

It will be appreciated that the method of the third aspect suitably further comprises the step of cutting said film or said cap liner to an appropriate size such that it is able to be inserted into the interior of the cap, and in juxtaposition with planar top portion thereof.

It will further be appreciated that, prior to disposing the cap over the opening of the container, said method suitably comprises the step of filling said container with a product, for instance foods, drugs, beverages, alkalis, acids, oils, organic solvents, flammable materials, powders, pellets and the like.

It will further be appreciated that during the induction heating step, the cap is in relatively closer proximity to the induction coil than the container is to the induction coil.

The preferences and disclosures of the first and second aspects are equally applicable to the third aspect.

According to a fourth aspect of the present invention, there is provided a method of sealing a container comprising an opening, wherein said method comprises the steps of:
 (i) providing or preparing a film according to the first aspect of the invention;
 (ii) laminating a film from step (i) with a metallic foil to provide a lidding film according to the second aspect of the invention;
 (iii) providing a container;
 (iv) disposing said lidding film from step (ii) over the opening of the container such that the heat-sealable layer of said lidding film contacts the container; and
 (v) subjecting the lidding film to electromagnetic induction heating, typically by passing the assembly of lidding film and container under an induction coil, thereby sealing the lidding film to the container.

In the fourth aspect of the invention, there is no additional cap or closure device which overlies the lidding film. The lidding film is disposed on, and induction-sealed to, the container without a cap. Thus, the method of the fourth aspect is a capless induction sealing method, also sometimes referred to in the art as "direct application".

It will be appreciated that the method of the fourth aspect suitably further comprises the step of cutting said lidding film to an appropriate size such that it covers the opening of the container and is able to be sealed to the edges of said opening.

The preferences and disclosures of the first, second and third aspects are equally applicable to the fourth aspect.

According to a fifth aspect of the present invention, there is provided a method of sealing a container comprising an opening, wherein said method comprises the steps of:
 (i) providing or preparing a film according to the first aspect of the invention;
 (ii) providing a container;
 (iii) disposing said film from step (i) over the opening of the container such that the heat-sealable layer of said film contacts the container; and
 (iv) subjecting the film to heat and optionally pressure, thereby sealing the film to the container.

In the fifth aspect of the invention, there is no additional cap or closure device which overlies the film, and there is no metallic foil layer present in the film. The heat-seal bond between the film and the container is created by conventional conductive heating, i.e. not by induction heating.

It will be appreciated that the method of the fifth aspect suitably further comprises the step of cutting said film to an appropriate size such that it covers the opening of the container and is able to be sealed to the edges of said opening.

The preferences and disclosures of the first aspect are equally applicable to the fifth aspect.

According to a sixth aspect of the invention there is provided a sealed container comprising a container with an opening and further comprising a film according to the first aspect of the invention or a lidding film (preferably a cap-liner) according to the second aspect of the invention, which is sealed around the edges of said opening, preferably wherein the sealed container further comprises a cap which is disposed over said sealed opening.

Preferably, the sealed container of the sixth aspect is an induction-sealed container, which may be prepared by the third, fourth or fifth aspects of the invention.

The preferences and disclosures of the first, second, third, fourth and fifth aspects are equally applicable to the sixth aspect.

Property Measurement

The following test methods may be used to characterise the polymeric film:
 (i) Intrinsic viscosity (in units of dL/g) of the polyester is measured by solution viscometry in accordance with ASTM D5225-98(2003) on a Viscotek™ Y-501C Relative Viscometer (see, for instance, Hitchcock, Hammons & Yau in American Laboratory (August 1994) "The dual-capillary method for modern-day viscometry") by using a 0.5% by weight solution of polyester in o-chlorophenol at 25° C. and using the Billmeyer single-point method to calculate intrinsic viscosity:

$$(\eta = 0.25 \; \eta red + 0.75(\ln \eta rel)/c$$

wherein:
η=the intrinsic viscosity (in dL/g),
ηrel=the relative viscosity,
c=the concentration (in g/dL), &
ηred=reduced viscosity (in dL/g), which is equivalent to (ηrel−1)/c (also expressed as ηsp/c where ηsp is the specific viscosity).

(ii) Glass transition temperature (Tg) and crystalline melting point ($T_m$) were measured by differential scanning calorimetry (DSC) using a PerkinElmer HyperDSC 8500. Unless otherwise stated, measurements were made according to the following standard test method and based on the method described in ASTM E1356-98. The sample was maintained under an atmosphere of dry nitrogen for the duration of the scan. A flow rate of 20 ml min$^{-1}$ and Al pans were used. Samples (5 mg) were heated at 20° C./min from 20° C. to 350° C.
The value of a $T_g$ was determined as the extrapolated onset temperature of the glass transition observed on the DSC scans (heat flow (W/g) against temperature (C)), as described in ASTM E1356-98. The value of a $T_m$ was determined from the DSC scans as the peak endotherm of the transition.

(iii) Softening point was measured as the Ring and Ball softening point according to ASTM E28-18.

(iv) Tensile strength at break and elongation at break of the copolyesters were measured according to ASTM D638-14 using the Type I sample configuration.

(v) Crystallinity was measured from the DSC analysis described hereinabove as the degree of crystallinity ($X_c$) calculated according to the equation:

$$X_c = \Delta H_m / \Delta H_m^\circ$$

wherein:
$\Delta H_m$=experimental enthalpy of fusion calculated from the integral of the melting endotherm;
$\Delta H_m^\circ$=theoretical enthalpy of fusion of the corresponding poly(alkylene-carboxylate) homopolymer at 100% crystallinity. Thus, for PET (or PET-based) polyesters, $\Delta H_m^\circ$ is the theoretical enthalpy of fusion of a 100% crystalline PET polymer (140 J/g), and for PEN (or PEN-based) polyesters, $\Delta H_m^\circ$ is the theoretical enthalpy of fusion of a 100% crystalline PEN polymer (103 J/g), as defined in the literature (B. Wunderlich, Macromolecular Physics, Academic Press, New York, (1976)).

(vi) Heat-seal peel strength of the film was assessed by measuring the seal strength of the coated film to the APET layer of an APET-CPET coextruded substrate (APET: amorphous PET; CPET: crystalline PET; total thickness of substrate was 330 μm). The coated film was heat-sealed to APET-coex-CPET substrate using a Sentinel heat sealer (Model 12 by Packaging Industries Group Inc.) at three different temperatures. The heat sealer temperatures (top jaw) were: 121° C. ($T_1$), 177° C. ($T_2$), 204° C. ($T_3$) with a dwell time of 1 second and a pressure of 40 psi (275.79 kPa). The bottom jaw was at approximately 38° C. when the top jaw temperature was changed. The sealed sample was marked and cut into 25 mm width strips, and the heat seal strength was determined on a Thwing-Albert peel tester. The jaws were set 50 mm apart. The upper jaw held the film piece of the sealed sample and travelled up at a speed of 250 mm/min, while the lower jaw held the APET-coex-APET piece of the sealed sample and was stationary. Six sealed sample pieces were measured for each coated sample and the mean average force (in g/inch) needed to separate the two pieces of film was recorded. For sealed samples which shredded, the lowest force was recorded. It will be appreciated that for samples which exhibited shredding, the peel strength varies across the seal area such that the peel strength is greater than the cohesive strength in some regions of the film.

(vii) Induction-seal peel strength of a cap-liner incorporating the film of the present invention was assessed by measuring the seal strength of a cap-liner to a white PET bottle (Packaging Options Direct, US) having a neck diameter of 38 mm in which the wall thickness of the bottle neck was 2.2 mm. The seal strength was tested using a Thwing-Albert peel tester according to the test method described hereinabove except that the stationary lower jaw held the PET bottle while the upper jaw peeled the cap-liner from the bottle. The cap-liner was inserted into a white 38/400 cap (SKS Bottle & Pkg, Inc.) and induction-sealed to the top of the bottle. Induction-sealing was performed on an Ifoiler Induction Sealer (Pillar Tech. LLC) using a cap torque of 20 lbf*in (pound-force-inch), an air gap (induction sealer head to bottle cap) of ⅛" (3.175 mm) and a conveyor line speed 60 feet/min (18.288 m/min). The power output of the induction-sealing system was varied in order to investigate the performance of the films at different induction-sealing settings.
The testing of the examples hereinbelow involved the manufacture of a one-piece cap-liner by laminating the film with an aluminium foil layer (of thickness 25.4 μm) followed by laminating with a layer of paper (of thickness 127 μm).

The invention is further illustrated by the following examples. It will be appreciated that the examples are for illustrative purposes only and are not intended to limit the invention as described above. Modification of detail may be made without departing from the scope of the invention.

EXAMPLES

A series of coated films were prepared by coating a coating composition on a biaxially oriented PET film of thickness 12.5 μm and then dried. The dry coat-weight of the coating composition was 2.3 g/m². The coating compositions were as follows.

Comparative Example 1

A coating solution was prepared by dissolving copolyester 1 (532 g) and copolyester 2 (133 g) in THF (2,800 g) at 55° C., followed by the addition of slip/anti-blocking ingredients (fatty amide 10.5 g; silica 24.5 g). Copolyester 1 was a PET-based copolyester in which the dicarboxylic acid fraction comprised 45 mol % azelaic acid, and which exhibited a tensile strength of 2700 psi and an elongation of 1000%, measured as defined herein. Copolyester 2 was a PET-based copolyester in which the dicarboxylic acid fraction comprised 33 mol % isophthalic acid, and which exhibited a tensile strength of 11000 psi and an elongation of 5%, measured as defined herein.

Example 1

A coating solution was prepared by dissolving copolyester 1 (476 g) and copolyester 2 (203 g) in THF (2,800 g) at 55° C., followed by the addition of slip/anti-blocking ingredients (fatty amide 10.5 g; silica 10.5 g). Copolyester 1 was a PET-based copolyester in which the dicarboxylic acid fraction comprised 45 mol % azelaic acid, and which exhibited a tensile strength of 2700 psi and an elongation of 1000%, measured as defined herein. Copolyester 2 was a PET-based copolyester in which the dicarboxylic acid fraction comprised 58 mol % sebacic acid, and which exhibited a tensile strength of 1000 psi and an elongation of 1600%, measured as defined herein.

Example 2

A coating solution was prepared by dissolving copolyester 1 (476 g) and copolyester 2 (203 g) in THF (2,800 g) at 55° C., followed by the addition of slip/anti-blocking ingredients (fatty amide 10.5 g; silica 10.5 g). Copolyester 1 was a PET-based copolyester in which the dicarboxylic acid fraction comprised 45 mol % azelaic acid, and which exhibited a tensile strength of 2500 psi and an elongation of 1200%, measured as defined herein. Copolyester 2 was a PET-based copolyester in which the dicarboxylic acid fraction comprised 58 mol % sebacic acid, and which exhibited a tensile strength of 1000 psi and an elongation of 1600%, measured as defined herein.

Cap-Liners

Each of the films was made into a one-piece cap-liner by laminating the film with an aluminium foil layer (of thickness 25.4 μm) followed by laminating with a layer of paper foam (of thickness 127 μm). The cap-liner was inserted into a white 38/400 cap (SKS Bottle & Pkg, Inc.) and induction-sealed to a white PET bottle (Packaging Options Direct, US) having a neck diameter of 38 mm in which the wall thickness of the bottle neck was 2.2 mm. Induction-sealing was performed on an Ifoiler Induction Sealer (Pillar Tech. LLC) using a cap torque of 20 lbf*in (pound-force-inch), an air gap (induction sealer head to bottle cap) of ⅛" (3.175 mm) and a conveyor line speed 60 feet/min (18.288 m/min).

Table 1 shows the properties of the copolyesters, the films containing them and the cap-liners made therefrom, characterised according to the test methods described hereinabove.

The data in Table 1 show that the variation in heat-seal peel strength over the temperature range of 121 to 204° C. is much larger for Comparative Example 1 and advantageously smaller for Examples 1 and 2. Thus, the inventive examples advantageously exhibit a much lower variation in heat-seal strength with changes in temperature. It will be appreciated that temperatures can be controlled more precisely in a heat-sealing system than in an induction system and that the heat-seal testing was conducted at different temperatures in order to recreate the varying temperature conditions in a conventional induction-sealing system.

The data in Table 1 also show that the variation in heat-seal peel strength after ageing is much larger for Comparative Example 1 and advantageously smaller for Examples 1 and 2. Thus, the inventive examples advantageously exhibit a much smaller increase in heat-seal strength over time.

A similar trend was observed for the induction-seal peel strength data in Table 1. The variation in peel strength after ageing is advantageously much smaller for Example 2 (Example 1 was not tested), compared to Comparative Example 1, which was observed at all power settings tested for each film. The power setting was adjusted to optimise the seal strength of the heat-seal bond. For Comparative Example 1 the optimal setting was 48% of the potential power output of the induction sealing system, whereas for Example 2 the optimal setting was 32% of the potential power output of the induction sealing system in order to provide comparable aged peel strengths to Comparative Example 1. It will be appreciated that the inventive Example also surprisingly allows a reduction in the energy used to make an appropriate heat-seal bond, thereby improving the economy and sustainability of the process.

TABLE 1

| | Copolyester 1 | | | | Copolyester 2 | | | | Heat-seal peel strength | | | | Induction-seal peel strength (PS) of cap-liner (g) | | |
|---|---|---|---|---|---|---|---|---|---|---|---|---|---|---|---|
| | Co-diacid (mol %) | Amount (wt %) | Tg (° C.) | Ts (° C.) | Co-diacid (mol %) | Amount (wt %) | Tg (° C.) | Ts (° C.) | T $^e$ | (PS) of film (g/inch) | | | Power output | Unaged | Aged (24 h) | Δ-PS on ageing (%) |
| | | | | | | | | | | Unaged | Aged (24 h) | Δ-PS on ageing | | | | |
| C. Ex. 1 | Azelaic acid (45 mol %) | 76 wt % | −8 | 150 | isophthalic acid (33 mol %) | 19 wt % | 70 | 150 | $T_1$ | 711 | 1142 | 431 | 44% | 496 | 753 | 52% |
| | | | | | | | | | $T_2$ | >1078 $^a$ | >1556 $^c$ | 478 $^c$ | 46% | 463 | 839 | 81% |
| | | | | | | | | | $T_3$ | >1326 $^b$ | >1600 $^d$ | n/a $^d$ | 48% | 679 | 1020 | 50% |
| Ex. 1 | Azelaic acid (45 mol %) | 68 wt % | −8 | 150 | sebacic acid (58 mol %) | 29 wt % | −22 | 100 | $T_1$ | 929 | 1123 | 194 | — | — | — | — |
| | | | | | | | | | $T_2$ | 914 | 1092 | 178 | — | — | — | — |
| | | | | | | | | | $T_3$ | 1165 | 1308 | 143 | — | — | — | — |
| Ex. 2 | Azelaic acid (45 mol %) | 68 wt % | −7 | 145 | sebacic acid (58 mol %) | 29 wt % | −22 | 100 | $T_1$ | 777 | 941 | 164 | 28% | 503 | 669 | 33% |
| | | | | | | | | | $T_2$ | 841 | 990 | 149 | 30% | 914 | 910 | −4% |
| | | | | | | | | | $T_3$ | 897 | 1022 | 125 | 32% | 970 | 1106 | 14% |

Key
$^a$ 1 of 6 samples shredded;
$^b$ 3 of 6 samples shredded;
$^c$ 5 of 6 samples shredded;
$^d$ 6 of 6 samples shredded
$^e$ heat-seal temperatures were: $T_1$ = 121° C.; $T_2$ = 177° C.; $T_3$ = 204° C.

The invention claimed is:

1. A polymeric film comprising a polyester substrate layer and a heat-sealable polymeric layer disposed on one surface of said polyester substrate layer, wherein the heat-sealable polymeric layer comprises copolyester A having a glass transition temperature Tg(A) in an amount $W_A$ and copolyester B having a glass transition temperature Tg(B) in an amount $W_B$, wherein:
   (i) $W_A > W_B$;
   (ii) $W_A$ is at least 50 wt % by total weight of the heat-sealable polymeric layer;
   (iii) $W_B$ is at least 10 wt % by total weight of the heat-sealable polymeric layer;
   (iv) Tg(A)>Tg(B);
   (v) Tg(B) is in the range of −35° C. to −10° C.; and
   (vi) Tg(A) is in the range of −15° C. to 5° C.

2. A polymeric film according to claim 1 wherein said polyester substrate layer is oriented.

3. A polymeric film according to claim 1 wherein said substrate layer polyester is polyethylene terephthalate (PET) or a PET-based copolyester.

4. A polymeric film according to claim 1, wherein Tg(B) is at least 5° C. lower than Tg(A).

5. A polymeric film according to claim 1, wherein Tg(A) is in the range of −10° C. to 0° C.

6. A polymeric film according to claim 1, wherein Tg(B) is in the range of −30° C. to −15° C.

7. A polymeric film according to claim 1, wherein copolyester A and copolyester B are independently selected from copolyesters derived from an aromatic dicarboxylic acid, an aliphatic dicarboxylic acid and a glycol.

8. A polymeric film according to claim 7, wherein the aromatic dicarboxylic acid in copolyester A is the same as the aromatic dicarboxylic acid in copolyester B.

9. A polymeric film according to claim 7, wherein copolyester A and copolyester B are independently selected from copolyesters in which the acid fraction contains an aromatic dicarboxylic acid and an aliphatic dicarboxylic acid, wherein the aliphatic dicarboxylic acid makes up from 10 to 90 mol % of the total acid fraction of the copolyester, with the balance being made up of the aromatic dicarboxylic acid.

10. A polymeric film according to claim 7, wherein the aliphatic dicarboxylic acid content of copolyester A is lower than the aliphatic dicarboxylic acid content of copolyester B.

11. A polymeric film according to claim 7, wherein the aliphatic dicarboxylic acid content of copolyester A is no more than 50 mol % of the total acid fraction of the copolyester.

12. A polymeric film according to claim 7, wherein the aliphatic dicarboxylic acid content of copolyester B is greater than 40 mol % of the total acid fraction of the copolyester.

13. A polymeric film according to claim 1, wherein copolyester A is a major copolyester in the heat-sealable layer and is present in an amount $W_A$ which is from 50 to 90 wt % by total weight of the heat-sealable polymeric layer.

14. A polymeric film according to claim 1, wherein copolyester B is a minor copolyester in the heat-sealable layer and is present in an amount $W_B$ which is from 10 to 50 wt % by total weight of the heat-sealable polymeric layer.

15. A polymeric film according to claim 1, wherein the heat-sealable layer further comprises one or more anti-blocking agent(s) to improve the handling properties of the film.

16. A polymeric film according to claim 1, wherein the softening point of copolyester A is from 120 to 160° C., determined according to ASTM E28-18.

17. A polymeric film according to claim 1, wherein the softening point of copolyester B is from 60 to 120° C., determined according to ASTM E28-18.

18. A polymeric film according to claim 1, wherein the tensile strength at break of copolyester A is at least 6890 kPa (1000 psi), determined according to ASTM D638-14.

19. A polymeric film according to claim 1, wherein the tensile strength at break of copolyester B is at least 1380 kPa (200 psi), determined according to ASTM D638-14.

20. A polymeric film according to claim 1, wherein the elongation at break of copolyester A is at least 250%, determined according to ASTM D638-14.

21. A polymeric film according to claim 1, wherein the elongation at break of copolyester B is at least 500%, determined according to ASTM D638-14.

22. A polymeric film according to claim 1, wherein said heat-sealable polymeric layer is a coated heat-sealable polymeric layer.

23. A polymeric film according to claim 1, wherein the total thickness of the film is from 5 to 250 μm.

24. A polymeric film according to claim 1, wherein the heat-seal peel strength of the film is in the range of 197 to 551 g/cm (500 to 1400 g/inch), measured as defined herein, when heat-sealed to an amorphous polyethylene terephthalate (APET) layer of an amorphous polyethylene terephthalate-crystalline polyethylene terephthalate or an amorphous polyethylene terephthalate-semicrystalline polyethylene terephthalate (APET-CPET) coextruded substrate with a dwell time of 1 second, a pressure of 276 kPa (40 psi) and at a temperature in the range of from 121 to 204° C.

25. A lidding film comprising the polymeric film according to claim 1 and further comprising a metallic foil layer such that the layer sequence is: metallic foil layer/polyester substrate layer/polymeric heat-sealable layer.

26. A lidding film according to claim 25 wherein the metallic foil layer is an aluminium foil layer and/or the thickness of the metallic foil layer is in the range of about 25 to about 50 μm.

27. A lidding film according to claim 25 wherein the longest dimension of the lidding film is no more than 70 mm.

28. A lidding film according to claim 25 further comprising a paper or foam layer disposed on the side of the metallic foil layer which is remote from the polymeric substrate layer, such that the layer sequence is: paper or foam layer/metallic foil layer/polyester substrate layer/heat-sealable layer.

29. A lidding film according to claim 25 further comprising a pulpboard layer and a wax layer, such that the layer sequence is pulpboard layer/wax layer/metallic foil layer/polymeric substrate layer/polymeric heat-sealable layer.

30. A lidding film according to claim 29 wherein the pulpboard layer is 50-1000 μm in thickness.

31. A lidding film according to claim 25 which is a cap-liner.

32. A method of sealing a container comprising an opening, wherein said method comprises the steps of:
   (i) providing or preparing the film according to claim 1;
   (ii) laminating the film from step (i) with a metallic foil, and either a paper or foam layer or pulpboard and wax layers, to form a cap-liner comprising the layer sequence: (a) paper or foam layer/metallic foil layer/polyester substrate layer/polymeric heat-sealable layer, or (b) pulpboard layer/wax layer/metallic foil layer/polymeric substrate layer/polymeric heat-sealable layer;
   (iii) providing a container;
   (iv) providing a cap for the container;

(v) inserting the cap-liner from step (ii) inside the cap;
(vi) disposing the cap over the opening of the container such that the heat-sealable layer of the cap-liner contacts the container; and
(vii) subjecting the cap to electromagnetic induction heating, thereby sealing the cap-liner to the container.

33. A method of sealing a container comprising an opening, wherein said method comprises the steps of:
(i) providing or preparing the film according to claim 1;
(ii) laminating the film from step (i) with a metallic foil to provide a lidding film comprising the layer sequence: metallic foil layer/polyester substrate layer/polymeric heat-sealable layer;
(iii) providing a container;
(iv) disposing said lidding film from step (ii) over the opening of the container such that the heat-sealable layer of said lidding film contacts the container; and
(v) subjecting the lidding film to electromagnetic induction heating, thereby sealing the lidding film to the container.

34. A method of sealing a container comprising an opening, wherein said method comprises the steps of:
(i) providing or preparing the film according to claim 1;
(ii) providing a container;
(iii) disposing said film according to step (i) over the opening of the container such that the heat-sealable layer of said film contacts the container;
(iv) subjecting the film to conductive heat and optionally pressure, thereby sealing the film to the container.

35. A sealed container comprising a container with an opening and further comprising a film according to claim 1, wherein said film is sealed around the edges of said opening.

* * * * *